United States Patent
Zhao et al.

(10) Patent No.: US 12,479,299 B2
(45) Date of Patent: Nov. 25, 2025

(54) VEHICLE THERMAL RUNAWAY WARNING METHOD, DEVICE, ELECTRONIC EQUIPMENT, AND READABLE STORAGE MEDIUM

(71) Applicants: ZHEJIANG ZEEKR INTELLIGENT TECHNOLOGY CO., LTD., Ningbo (CN); VIRIDI E-MOBILITY TECHNOLOGY (NINGBO) CO., LTD., Ningbo (CN); ZHEJIANG GEELY HOLDING GROUP CO., LTD., Hangzhou (CN)

(72) Inventors: Zhiwei Zhao, Ningbo (CN); Shangbing Niu, Ningbo (CN); Huan Wang, Ningbo (CN); Ruitian Zhang, Ningbo (CN); Ziwei Deng, Ningbo (CN); Zhe Sun, Ningbo (CN); Yaqi Niu, Ningbo (CN)

(73) Assignees: ZHEJIANG ZEEKR INTELLIGENT TECHNOLOGY CO., LTD., Ningbo (CN); VIRIDI E-MOBILITY TECHNOLOGY (NINGBO) CO., LTD., Ningbo (CN); ZHEJIANG GEELY HOLDING GROUP CO., LTD., Hangzhou (CN)

( * ) Notice: Subject to any disclaimer, the term of this patent is extended or adjusted under 35 U.S.C. 154(b) by 361 days.

(21) Appl. No.: 18/222,075

(22) Filed: Jul. 14, 2023

(65) Prior Publication Data
US 2024/0034150 A1  Feb. 1, 2024

(30) Foreign Application Priority Data
Jul. 27, 2022  (CN) .......................... 202210891074.3

(51) Int. Cl.
*B60L 3/00*   (2019.01)
*B60L 58/16*  (2019.01)
(Continued)

(52) U.S. Cl.
CPC ............. *B60L 3/0046* (2013.01); *B60L 58/16* (2019.02); *H01M 10/4207* (2013.01); *H01M 10/482* (2013.01)

(58) Field of Classification Search
CPC .. B60L 3/0046; B60L 58/16; B60L 2240/545; B60L 2240/547; B60L 2240/80;
(Continued)

(56) References Cited

U.S. PATENT DOCUMENTS

| | | | |
|---|---|---|---|
| 7,939,192 B2 | 5/2011 | Hermann | |
| 8,896,815 B2 | 11/2014 | Mulder | |

(Continued)

FOREIGN PATENT DOCUMENTS

| | | |
|---|---|---|
| CN | 111993896 A | 11/2020 |
| CN | 114415053 A | 4/2022 |

(Continued)

OTHER PUBLICATIONS

Extended European Search Report issued in corresponding European Application No. 23186078.4, mailed on Dec. 14, 2023, 7 pages.
(Continued)

*Primary Examiner* — Rodney A Butler
(74) *Attorney, Agent, or Firm* — Bayes PLLC (57) ABSTRACT

Disclosed herein are a vehicle thermal runaway warning method, device, electronic equipment and readable storage medium. The method of vehicle thermal runaway warning includes obtaining operating data of a vehicle, the operating data including a plurality of cell voltage data of a battery pack in the vehicle, and dividing time windows for the
(Continued)

plurality of cell voltage data according to a collection timing of the operating data. The method also includes extracting cell voltage characteristics from a partial cell voltage data corresponding to each of the divided time windows. The method further includes, in response to each cell voltage characteristic meeting a preset voltage warning condition, determining that the vehicle has a risk of thermal runaway, and controlling the vehicle to output thermal runaway warning information.

20 Claims, 4 Drawing Sheets

(51) Int. Cl.
*H01M 10/42* (2006.01)
*H01M 10/48* (2006.01)

(58) Field of Classification Search
CPC ............... B60L 2250/10; B60L 58/10; H01M 10/4207; H01M 10/482; H01M 2010/4271; H01M 2220/20; H01M 10/42; H01M 10/425; H01M 10/48; H01M 10/486; G01R 31/392; G01R 31/396; B60Y 2200/91; B60Y 2400/112; B60Y 2400/90; Y02T 10/70
See application file for complete search history.

(56) References Cited

U.S. PATENT DOCUMENTS

| | | | |
|---|---|---|---|
| 11,342,601 B2* | 5/2022 | Chen | H01M 10/63 |
| 2014/0285936 A1 | 9/2014 | Garbacik et al. | |
| 2020/0025832 A1 | 1/2020 | Cho et al. | |
| 2021/0190881 A1 | 6/2021 | Lee et al. | |
| 2022/0140617 A1 | 5/2022 | Wang et al. | |

FOREIGN PATENT DOCUMENTS

| | | |
|---|---|---|
| CN | 114583301 A | 6/2022 |
| JP | 2017092028 A | 5/2017 |
| JP | 2021047132 A | 3/2021 |
| WO | 2019017991 A1 | 1/2019 |
| WO | 2022001197 A1 | 1/2021 |

OTHER PUBLICATIONS

Notice of Reasons for Refusal issued in corresponding Japanese Application No. 2023-115176, mailed on Jun. 4, 2024, 6 pages.
Notice of Reasons for Refusal in related Japanese Application No. 2023-115176 dated Nov. 7, 2024 (7 pages).
Korean Notice of Allowance in related Korean Application No. 10-2023-0096194 dated Oct. 15, 2025 (5 pages).

* cited by examiner

FIG. 5

VEHICLE THERMAL RUNAWAY WARNING METHOD, DEVICE, ELECTRONIC EQUIPMENT, AND READABLE STORAGE MEDIUM

CROSS-REFERENCE TO RELATED APPLICATIONS

This application claims the benefit of priority to Chinese Patent Application No. 202210891074.3, filed on Jul. 27, 2022, the entire contents of which are incorporated herein by reference.

TECHNICAL FIELD

The present application relates to the technical field of electric vehicles, in particular to a vehicle thermal runaway warning method, device, electronic equipment, and readable storage medium.

BACKGROUND

With the rapid development of electric vehicles, lithium batteries are widely used in electric vehicles due to their high voltage, high specific energy, and long cycle life. When the electric vehicle fails, a large amount of heat energy will be released inside the battery, which is the thermal runaway phenomenon of the electric vehicle, and too much heat energy may cause the vehicle to catch fire or even explode. Therefore, it is particularly important to detect the thermal runaway risk of electric vehicles and provide early warning to remind users to replace the battery pack to avoid thermal runaway.

Nowadays, the method for detecting the thermal runaway risk is usually to obtain parameters such as temperature, voltage, current and discharge rate of the battery body. Since the thermal runaway phenomenon generally spreads from a single cell to the entire battery, only detecting the risk of vehicle thermal runaway based on the overall parameters of the battery will make the timeliness of the thermal runaway risk warning low, so that the user cannot replace the battery in time, and the risk of vehicle thermal runaway is still high.

SUMMARY

The main purpose of the present application is to provide a vehicle thermal runaway warning method, device, electronic equipment and readable storage medium, aiming to solve the technical problem of high risk of vehicle thermal runaway in the related art.

In order to achieve the above purpose, the present application provides a vehicle thermal runaway warning method, applied to a vehicle thermal runaway warning device. The vehicle thermal runaway warning method includes obtaining operating data of a vehicle, the operating data being a plurality of cell voltage data of a battery pack in the vehicle; dividing time windows for the plurality of cell voltage data according to a collection timing of the operating data, and extracting cell voltage characteristics from a partial cell voltage data corresponding to each of the divided time windows; and in response to that each cell voltage characteristic meets a preset voltage warning condition, determining that the vehicle has a risk of thermal runaway, and controlling the vehicle to output thermal runaway warning information.

In an embodiment, after dividing the time windows for the plurality of cell voltage data according to the collection timing of the operating data, the method further includes obtaining a voltage range of the battery pack in the vehicle; constructing a voltage interval corresponding to the operating data of the vehicle according to the voltage range and a preset voltage interval range, the voltage interval including at least one voltage subinterval; and dividing the partial cell voltage data corresponding to each of the time windows into corresponding voltage subinterval.

In an embodiment, the cell voltage characteristic includes a first characteristic value and a second characteristic value. The extracting the cell voltage characteristics from the partial cell voltage data corresponding to each of the divided time windows includes selecting a high voltage subinterval and a corresponding low voltage subinterval corresponding to the partial cell voltage data in each of the voltage subintervals; determining a first voltage deviation value of the high voltage subinterval and a second voltage deviation value of the low voltage subinterval in the partial cell voltage data corresponding to each of the time windows; and using a voltage deviation difference between the first voltage deviation value and the second voltage deviation value as the first characteristic value, and using the second voltage deviation value as the second characteristic value.

In an embodiment, before in response to that each cell voltage characteristic meets the preset voltage warning condition, determining that the vehicle has the risk of thermal runaway, and controlling the vehicle to output the thermal runaway warning information, the method further includes determining whether the first characteristic value is greater than a preset characteristic threshold and whether a first discrete degree of the first characteristic value meets a preset first discrete degree, and determining whether the second discrete degree of the second characteristic value meets a preset second discrete degree; and in response to that the first characteristic value is greater than the preset characteristic threshold, the first discrete degree meets the preset first discrete degree, and the second discrete degree meets the preset second discrete degree, determining that the cell voltage characteristic meets the preset voltage warning condition.

In an embodiment, the determining the first voltage deviation value of the high voltage subinterval and the second voltage deviation value of the low voltage subinterval in the partial cell voltage data corresponding to each of the time windows includes obtaining a first voltage mean value difference of the high voltage subinterval and a second voltage mean value difference of the low voltage subinterval in the partial cell voltage data corresponding to each of the time windows; obtaining a first voltage deviation degree of the high voltage subinterval and a second voltage deviation degree of the low voltage subinterval; and obtaining a first voltage deviation value of the high voltage subinterval according to a first product of the first voltage mean value difference and the first voltage deviation degree, and obtaining a second voltage deviation value of the low voltage subinterval according to a second product of the second voltage mean value difference and the second voltage deviation degree.

In an embodiment, the obtaining the first voltage mean value difference of the high voltage subinterval and the second voltage mean value difference of the low voltage subinterval in the partial cell voltage data corresponding to each of the time windows includes using the partial cell voltage data corresponding to a first time window as an initial window data; obtaining a first cell voltage value of the high voltage subinterval in the initial window data, a second cell voltage value of the high voltage subinterval in the partial cell voltage data corresponding to each of the time windows, a third cell voltage value of the low voltage subinterval in the initial window data and a fourth cell voltage value of the low voltage subinterval in the partial cell voltage data corresponding to each of the time windows; and using a first voltage difference between the first cell voltage value and the second cell voltage value as a first voltage mean value difference of the high voltage subinterval, and using a second voltage difference between the third cell voltage value and the fourth cell voltage value as a second voltage mean value difference of the low voltage subinterval.

In an embodiment, the obtaining the first voltage deviation degree of the high voltage subinterval and the second voltage deviation degree of the low voltage subinterval includes obtaining a fifth cell voltage value of each cell voltage data in the high voltage subinterval, a sixth cell voltage value of each cell voltage data in the low voltage subinterval and a voltage median corresponding to each cell voltage data; and obtaining a first voltage deviation degree of the high voltage subinterval according to the fifth cell voltage value and the corresponding median voltage, and obtaining a second voltage deviation degree of the low voltage subinterval according to the sixth cell voltage value and the corresponding median voltage.

In order to achieve the above objective, the present application further provides a vehicle thermal runaway warning device, applied to a vehicle thermal runaway warning apparatus, including an obtaining module configure for obtaining operating data of a vehicle, the operating data being a plurality of cell voltage data of a battery pack in the vehicle; an extracting module configured for dividing time windows for the plurality of cell voltage data according to a collection timing of the operating data, and extracting cell voltage characteristics from a partial cell voltage data corresponding to each of the divided time windows; and a controlling module configured for in response to that each cell voltage characteristic meets a preset voltage warning condition, determining that the vehicle has a risk of thermal runaway, and controlling the vehicle to output thermal runaway warning information.

In an embodiment, after the operation of dividing the time windows for the plurality of cell voltage data according to the collection timing of the operating data, the vehicle thermal runaway warning device is further configured for obtaining a voltage range of the battery pack in the vehicle; constructing a voltage interval corresponding to the operating data of the vehicle according to the voltage range and a preset voltage interval range, the voltage interval including at least one voltage subinterval; and dividing the partial cell voltage data corresponding to each of the time windows into corresponding voltage subinterval.

In an embodiment, the cell voltage characteristic includes a first characteristic value and a second characteristic value, the extracting module is further configured for selecting a high voltage subinterval and a corresponding low voltage subinterval corresponding to the partial cell voltage data in each of the voltage subintervals; determining a first voltage deviation value of the high voltage subinterval and a second voltage deviation value of the low voltage subinterval in the partial cell voltage data corresponding to each of the time windows; and using a voltage deviation difference between the first voltage deviation value and the second voltage deviation value as the first characteristic value, and using the second voltage deviation value as the second characteristic value.

In an embodiment, before the operation of in response to that each cell voltage characteristic meets the preset voltage warning condition, determining that the vehicle has the risk of thermal runaway, and controlling the vehicle to output the thermal runaway warning information, the vehicle thermal runaway warning device is further configured for determining whether the first characteristic value is greater than a preset characteristic threshold and whether a first discrete degree of the first characteristic value meets a preset first discrete degree, and determining whether the second discrete degree of the second characteristic value meets a preset second discrete degree; and in response to that the first characteristic value is greater than the preset characteristic threshold, the first discrete degree meets the preset first discrete degree, and the second discrete degree meets the preset second discrete degree, determining that the cell voltage characteristic meets the preset voltage warning condition.

In an embodiment, the extracting module is further configured for obtaining a first voltage mean value difference of the high voltage subinterval and a second voltage mean value difference of the low voltage subinterval in the partial cell voltage data corresponding to each of the time windows; obtaining a first voltage deviation degree of the high voltage subinterval and a second voltage deviation degree of the low voltage subinterval; and obtaining a first voltage deviation value of the high voltage subinterval according to a first product of the first voltage mean value difference and the first voltage deviation degree, and obtaining a second voltage deviation value of the low voltage subinterval according to a second product of the second voltage mean value difference and the second voltage deviation degree.

In an embodiment, the extracting module is further configured for using the partial cell voltage data corresponding to a first time window as an initial window data; obtaining a first cell voltage value of the high voltage subinterval in the initial window data, a second cell voltage value of the high voltage subinterval in the partial cell voltage data corresponding to each of the time windows, a third cell voltage value of the low voltage subinterval in the initial window data and a fourth cell voltage value of the low voltage subinterval in the partial cell voltage data corresponding to each of the time windows; and using a first voltage difference between the first cell voltage value and the second cell voltage value as a first voltage mean value difference of the high voltage subinterval, and using a second voltage difference between the third cell voltage value and the fourth cell voltage value as a second voltage mean value difference of the low voltage subinterval.

In an embodiment, the extracting module is further configured for obtaining a fifth cell voltage value of each cell voltage data in the high voltage subinterval, a sixth cell voltage value of each cell voltage data in the low voltage subinterval and a voltage median corresponding to each cell voltage data; and obtaining a first voltage deviation degree of the high voltage subinterval according to the fifth cell voltage value and the corresponding median voltage, and obtaining a second voltage deviation degree of the low voltage subinterval according to the sixth cell voltage value and the corresponding median voltage.

The present application further provides an electronic equipment, including: a memory, a processor, and a vehicle thermal runaway warning program stored in the memory and executable by the processor. When the vehicle thermal runaway warning program is executed by the processor, the operations of the vehicle thermal runaway warning method as described above are realized.

The present application further provides a computer-readable storage medium. The computer-readable storage medium stores a program for realizing a vehicle thermal runaway warning method, when the vehicle thermal runaway warning program is executed by a processor, the operations of the vehicle thermal runaway warning method as described above are realized.

The present application further provides a computer program product, including a computer program. When the computer program is executed by a processor, the operations of the above-mentioned vehicle thermal runaway warning method are realized.

The present application provides a vehicle thermal runaway warning method, device, electronic equipment and readable storage medium. The method includes: obtaining operating data of a vehicle, the operating data being a plurality of cell voltage data of a battery pack in the vehicle; dividing time windows for the plurality of cell voltage data according to a collection timing of the operating data, and extracting cell voltage characteristics from a partial cell voltage data corresponding to each of the divided time windows; and in response to that each cell voltage characteristic meets a preset voltage warning condition, determining that the vehicle has a risk of thermal runaway, and controlling the vehicle to output thermal runaway warning information.

In the present application, by extracting the cell voltage characteristic of the cell voltage in the time series voltage data of the vehicle, the thermal runaway risk of the vehicle is determined according to the cell voltage characteristic, then the thermal runaway risk of the vehicle is warned, and the thermal runaway risk of the vehicle is determined according to the voltage characteristic change trend of the battery cell voltage. When the vehicle has a risk of thermal runaway, the thermal runaway warning information is input to prompt the user to replace the battery, thereby avoiding the thermal runaway phenomenon of the vehicle, reducing the thermal runaway risk of the vehicle and improving the safety of the vehicle.

BRIEF DESCRIPTION OF THE DRAWINGS

The accompanying drawings, which are incorporated in and constitute a part of this specification, illustrate embodiments consistent with the present application and together with the description serve to explain the principles of the present application.

In order to more clearly illustrate the technical solutions in the embodiments of the present application or the prior art, the following will briefly introduce the drawings that need to be used in the embodiments of the present application or the prior art. Apparently, those skilled in the art can also obtain other drawings based on these drawings without any creative effort.

The realization of the objective, functional characteristics, and advantages of the present application are further described with reference to the accompanying drawings.

DETAILED DESCRIPTION

In order to make the above objects, characteristics and advantages of the present application more obvious and understandable, the technical solutions in the embodiments of the present application will be clearly and completely described below in conjunction with the drawings in the embodiments of the present application. Apparently, the described embodiments are only some of the embodiments of the present application, not all of them. Based on the embodiments in the present application, all other embodiments obtained by persons of ordinary skill in the art without creative efforts shall fall within the scope of the present application. Embodiments of the present application provide a vehicle thermal runaway warning method. In a first embodiment of the present application, the vehicle thermal runaway warning method includes obtaining operating data of a vehicle, the operating data being a plurality of cell voltage data of a battery pack in the vehicle; dividing time windows for the plurality of cell voltage data according to a collection timing of the operating data, and extracting cell voltage characteristics from a partial cell voltage data corresponding to each of the divided time windows; and in response to that each cell voltage characteristic meets a preset voltage warning condition, determining that the vehicle has a risk of thermal runaway, and controlling the vehicle to output thermal runaway warning information.

It should be noted that, in this embodiment, in order to avoid thermal runaway of electric vehicles, the thermal runaway risk of the electric vehicle is detected, so as to give early warning to remind users to replace the battery pack to avoid thermal runaway. Nowadays, the method for detecting the thermal runaway risk is usually to obtain parameters such as temperature, voltage, current and discharge rate of the battery body. Since the thermal runaway phenomenon generally spreads from a single cell to the entire battery, only detecting the risk of vehicle thermal runaway based on the overall parameters of the battery will make the timeliness of the thermal runaway risk warning low, so that the user cannot replace the battery in time, and the risk of vehicle thermal runaway is still high.

Figure 1:
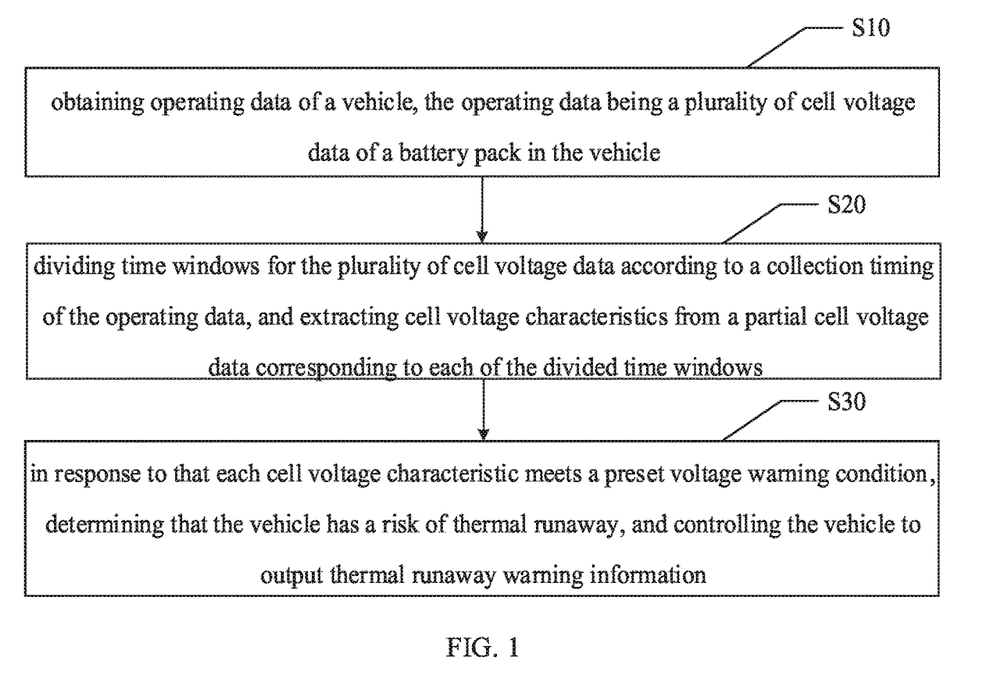
FIG. 1 is a schematic flowchart of a vehicle thermal runaway warning method according to a first embodiment of the present application.

For the above phenomenon, in the present application, by extracting the cell voltage characteristic of the cell voltage in the time series voltage data of the vehicle, the thermal runaway risk of the vehicle is determined according to the cell voltage characteristic, then the thermal runaway risk of the vehicle is warned, and the thermal runaway risk of the vehicle is determined according to the voltage characteristic change trend of the battery cell voltage. When the vehicle has a risk of thermal runaway, the thermal runaway warning information is input to prompt the user to replace the battery, thereby avoiding the thermal runaway phenomenon of the vehicle, reducing the thermal runaway risk of the vehicle and improving the safety of the vehicle. As shown in FIG. 1, in the first embodiment of the present application, the vehicle thermal runaway warning method includes the following operations:

Operation S10, obtaining operating data of a vehicle, the operating data being a plurality of cell voltage data of a battery pack in the vehicle.

The vehicle thermal runaway warning method of the present application can be applied to the vehicle or to the control system in the vehicle, and can also be applied to the server communicated with the vehicle. The communication connection can be a wired connection such as an interface, or a wireless connection such as Bluetooth or a local area network, so as to realize interactive processing of data and predict the thermal runaway risk of the vehicle. For the convenience of reading and understanding, the above-mentioned vehicle is used as the execution subject of the vehicle thermal runaway warning method of the present application to describe this embodiment in detail.

It should be noted that, in this embodiment, the operating data of the vehicle is the cell voltage data of the battery pack in the vehicle obtained at preset time intervals. The preset time interval is the preset interval time for collecting the operating data of the vehicle. The preset time interval can be 5 s or 10 s. The preset time interval can be randomly selected by the control system of the vehicle and/or the vehicle, or can be set by the user.

In this embodiment, before the thermal runaway phenomenon occurs in the vehicle, the vehicle obtains the operating data of the vehicle.

In this embodiment, the vehicle obtains the operating data of the vehicle from the pressure sensor built in the battery pack through reception.

Operation S20, dividing time windows for the plurality of cell voltage data according to a collection timing of the operating data, and extracting cell voltage characteristics from a partial cell voltage data corresponding to each of the divided time windows.

In this embodiment, according to a first ratio between the number of operating data of the vehicle to the number of preset window data, the time window division is performed on the operating data of the vehicle. The number of preset window data is the preset number of window data in each time window data. The number of preset window data is a number divisible by the number of operating data of the vehicle, and the number of preset window data may be 20,000 or 15,000. For example, when the number of operating data of the vehicle is 60,000 and the number of preset window data is 20,000, the number of time window data is 3. The operating data of the vehicle is divided into 3 time window data in chronological order, or the start and end time of each time window are obtained based on the product of the preset time interval and the number of preset window data. According to the start and end time of each time window, the time window division is performed on the operating data of the vehicle. For example, when the preset time interval is 10 s and the number of preset window data is 6, the start and end time of the first time window data is 0 s to 60 s, and the start and end time of the second time window data is 60 s to 120 s.

As a feasible embodiment, in the above operation S20, after the operation of dividing the time windows for the plurality of cell voltage data according to the collection timing of the operating data, the method further includes obtaining a voltage range of the battery pack in the vehicle.

It should be noted that, in this embodiment, the voltage range is composed of the maximum voltage value and the minimum voltage value of the battery pack in the vehicle, and the voltage range is determined by the battery characteristics of the battery pack in the vehicle. Battery characteristics include battery model and battery performance, and the voltage range can be 3.5V to 4.2V.

In this embodiment, the battery model and the battery performance of the battery pack in the vehicle are obtained, and the voltage range of the battery pack is obtained according to the battery model and the battery performance.

constructing a voltage interval corresponding to the operating data of the vehicle according to the voltage range and a preset voltage interval range, the voltage interval including at least one voltage subinterval.

It should be noted that, in this embodiment, the preset voltage range is the preset interval voltage of each voltage range, and the preset voltage range may be 0.05V or 0.1V.

In this embodiment, according to a second ratio between the voltage range and the preset voltage range, each voltage interval corresponding to the operating data of the vehicle is constructed. For example, when the voltage range is 3.5V to 4.2V and the preset voltage range is the first voltage subinterval is (3.5-3.6), the second voltage subinterval is (3.6-3.7), the third voltage subinterval is (3.7-3.8), . . . , and the nth voltage subinterval is (4.1-4.2).

dividing the partial cell voltage data corresponding to each of the time windows into corresponding voltage subinterval.

In this embodiment, the voltage median of the partial cell voltage data corresponding to each time window is obtained as the cell voltage value at each time window. According to the voltage interval where the cell voltage value is located, the cell voltage value of each partial cell voltage data is divided into corresponding voltage subintervals. For example, when the median voltage of the cell voltage data from the 0th to the 1st time window in the first time window is 3.57V, the cell voltage value from the 0th to the 1st time window in the first time window is 3.57V, which is divided into the first voltage subinterval (3.5-3.6).

Figure 2:
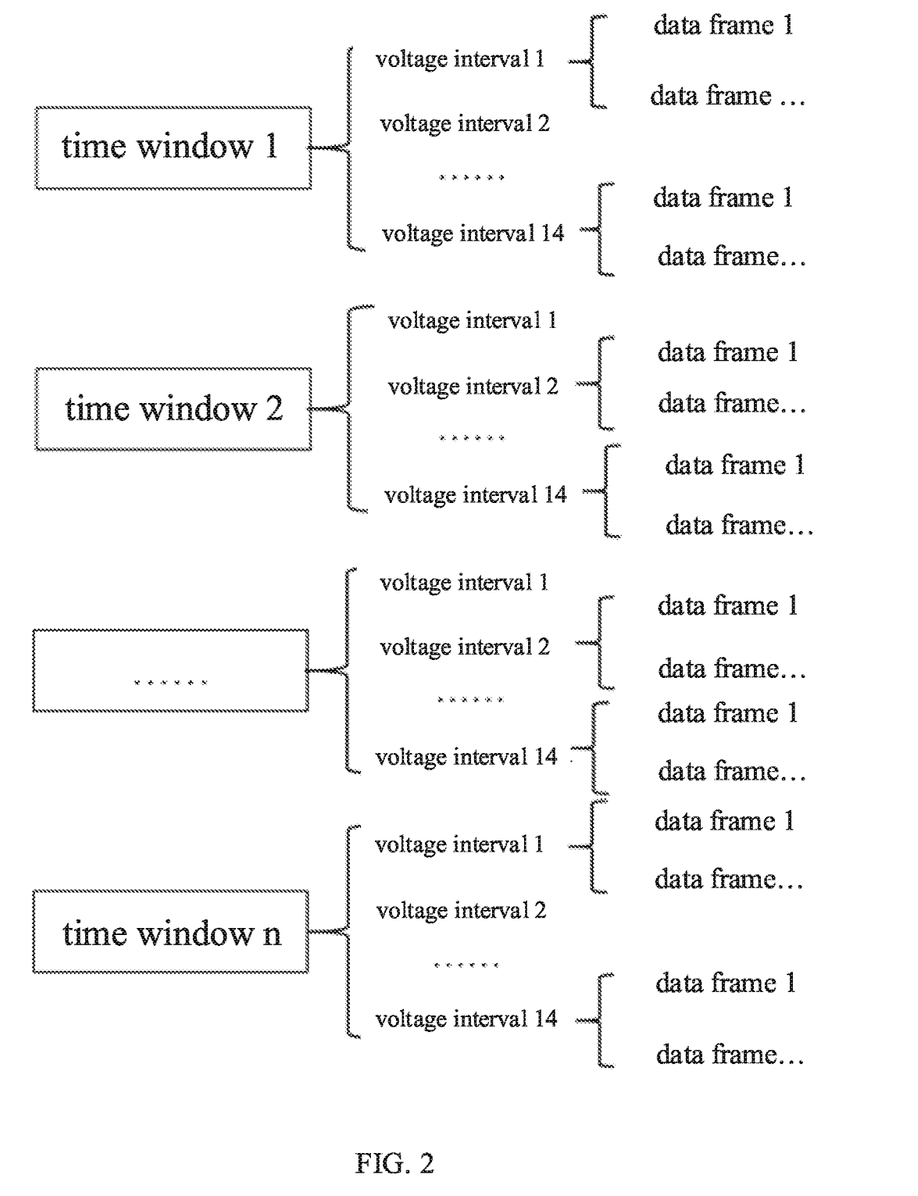
FIG. 2 is a schematic diagram of an application scenario of the vehicle thermal runaway warning method of the present application.

As an example, as shown in FIG. 2, FIG. 2 includes: time window data (time window 1, time window 2, . . . , time window n, and data frame 1, data frame . . . shown in the figure), voltage subinterval (voltage interval 1, voltage interval 2, . . . , voltage interval 14 shown in the figure).

As a feasible embodiment, in the above operation S20, the cell voltage characteristic includes a first characteristic value and a second characteristic value, the extracting the cell voltage characteristics from the partial cell voltage data corresponding to each of the divided time windows includes Operation S21, selecting a high voltage subinterval and a corresponding low voltage subinterval corresponding to the partial cell voltage data in each of the voltage subintervals.

In this embodiment, according to the voltage range of each voltage subinterval and the number of preset voltage intervals, the high voltage subinterval and the corresponding low voltage subinterval corresponding to the partial cell voltage data of the preset voltage interval are selected.

For example, when the number of preset voltage intervals is 2, the two intervals with the lowest voltage range of each voltage subinterval are regarded as low voltage subintervals, and the two intervals with the highest voltage range of each voltage subinterval are regarded as high voltage subintervals. Or the two intervals with the lowest voltage ranges of each voltage subinterval are averaged to obtain the low voltage subinterval, and the two intervals with the highest voltage ranges of each voltage subinterval are averaged to obtain the high voltage subinterval.

Operation S22, determining a first voltage deviation value of the high voltage subinterval and a second voltage deviation value of the low voltage subinterval in the partial cell voltage data corresponding to each of the time windows according to each partial cell voltage data.

Operation S23, using a voltage deviation difference between the first voltage deviation value and the second voltage deviation value as the first characteristic value, and using the second voltage deviation value as the second characteristic value.

In this embodiment, the voltage deviation difference between each first voltage deviation value and each second voltage deviation value of the partial cell voltage data corresponding to each time window is taken as the first characteristic value, each second voltage deviation value is taken as the second characteristic value, and the first characteristic value and the second characteristic value are integrated to obtain cell voltage characteristics corresponding to the partial cell voltage data in each time window.

As a feasible embodiment, in the above operation S30, before in response to that each cell voltage characteristic meets the preset voltage warning condition, determining that the vehicle has the risk of thermal runaway, and controlling the vehicle to output the thermal runaway warning information, the method further includes the following operations.

Operation A10, determining whether the first characteristic value is greater than a preset characteristic threshold and whether a first discrete degree of the first characteristic value meets a preset first discrete degree, and determining whether the second discrete degree of the second characteristic value meets a preset second discrete degree.

Operation A20, in response to that the first characteristic value is greater than the preset characteristic threshold, the first discrete degree meets the preset first discrete degree, and the second discrete degree meets the preset second discrete degree, determining that the cell voltage characteristic meets the preset voltage warning condition.

It should be noted that, in this embodiment, the preset characteristic threshold is a preset first characteristic critical value for determining that the voltage deviation difference between the first voltage deviation value of the high voltage subinterval and the second voltage deviation value of the low voltage subinterval is too small. The preset characteristic threshold can be 0.00001 or 0.00002. The preset first discrete degree is the predetermined discrete degree of the voltage deviation difference between the first voltage deviation value of the high voltage subinterval and the second voltage deviation value of the low voltage subinterval for determining that the vehicle may have a risk of thermal runaway. The preset first discrete degree may be 46. The preset second discrete degree is the predetermined discrete degree of the second voltage deviation value in the low voltage subinterval for determining that the vehicle may have a risk of thermal runaway, and the preset second discrete degree may be 16. The preset voltage warning condition is a preset cell voltage characteristic condition that the vehicle may have a risk of thermal runaway.

It can be understood that when the first characteristic value is greater than the preset characteristic threshold value, it means that there is a cell voltage in the battery pack of the vehicle that may be overheated. On this basis, when the first discrete degree meets the preset first discrete degree, and the second discrete degree meets the preset second discrete degree, it means that there are multiple cell voltages in the battery pack of the vehicle that are overheated, that is, there is a risk of thermal runaway of the vehicle.

In this embodiment, the first discrete degree of the first characteristic value and the second discrete degree of the second characteristic value are obtained, whether the first characteristic value is greater than the preset characteristic threshold and whether the first discrete degree meets the preset first discrete degree is determined, and whether the second discrete degree meets the preset second discrete degree is determined. If the first characteristic value is greater than the preset characteristic threshold, the first discrete degree meets the preset first discrete degree, and the second discrete degree meets the preset second discrete degree, it is determined that the cell voltage characteristic meets the preset voltage warning conditions. If the first characteristic value is not greater than the preset characteristic threshold, and/or, the first discrete degree does not meet the preset first discrete degree, and/or, the second discrete degree does not meet the preset second discrete degree, it is determined that the cell voltage characteristic does not meet the preset voltage warning conditions.

Operation S30, in response to that each cell voltage characteristic meets a preset voltage warning condition, determining that the vehicle has a risk of thermal runaway, and controlling the vehicle to output thermal runaway warning information.

It should be noted that, in this embodiment, the thermal runaway warning information is used to warn the user that the vehicle has a risk of thermal runaway, so that the user can replace the battery. The content of the thermal runaway warning information may be text display content, voice broadcast content, or a combination of text display content and voice broadcast content.

In this embodiment, whether each cell voltage characteristic meets the preset voltage warning condition is determined. If each cell voltage characteristic meets the preset voltage warning condition, it is determined that the vehicle has a risk of thermal runaway, and the vehicle is controlled to output thermal runaway warning information. If some cell voltage characteristics do not meet the preset voltage warning conditions, it is determined that the vehicle does not have a risk of thermal runaway, and return to perform the operation: extracting the cell voltage characteristics from the partial cell voltage data corresponding to each of the divided time windows.

In an embodiment, the operation of controlling the vehicle to output thermal runaway warning information may include controlling the on-board screen of the vehicle to display thermal runaway warning information, and/or controlling the sound broadcast module of the vehicle to broadcast thermal runaway warning information.

It can be understood that the internal resistance of each cell in the battery pack of the vehicle is calculated through the equivalent circuit model, and the risk of thermal runaway of the vehicle is determined according to the change of internal resistance of each cell, so as to control the vehicle to output thermal runaway warning information, thereby avoiding the risk of thermal runaway. Since the operating conditions of the real vehicle are not static, the risk of thermal runaway of the vehicle is determined only by the change of the internal resistance of the battery pack, without considering other factors, and it is easy to determine the risk of thermal runaway inaccurately. As a result, the accuracy of the thermal runaway alarm of the vehicle is low (for example, the thermal runaway alarm is performed when the vehicle does not have the risk of thermal runaway, or the thermal runaway alarm cannot be performed in time when the vehicle has the risk of thermal runaway). In the embodiment of the present application, by collecting the current temperature, temperature rise rate, voltage value, voltage value change rate, pressure value in the battery pack, gas composition and content of the battery pack of the vehicle, the risk of thermal runaway of the vehicle is determined to control the vehicle to output thermal runaway warning information, thereby avoiding the risk of thermal runaway. However, this method can only capture the early features of the vehicle when the safety fault has occurred, and give a safety fault alarm, and the time reserved for the user to replace the battery is short, resulting in a high risk of thermal runaway of the vehicle. Obtaining the above features requires built-in sensors and the sensors usually require regular maintenance, which increases the cost of detecting the risk of thermal runaway of the vehicle.

It can be understood that the preset voltage warning condition is the empirical value of the voltage characteristic warning obtained from the operating data of a large number of vehicles with thermal runaway phenomena. According to the preset voltage warning conditions, the risk of thermal runaway of the vehicle is determined on the voltage characteristic change trend of the cell voltage of the battery. When the vehicle has a risk of thermal runaway, the thermal runaway warning information is input to prompt the user to replace the battery, thereby avoiding the thermal runaway phenomenon of the vehicle, and reducing the risk of the thermal runaway phenomenon of the vehicle.

In this embodiment, the present application provides a vehicle thermal runaway warning method, device, electronic equipment and readable storage medium. The method includes: obtaining operating data of a vehicle, the operating data being a plurality of cell voltage data of a battery pack in the vehicle; dividing time windows for the plurality of cell voltage data according to a collection timing of the operating data, and extracting cell voltage characteristics from a partial cell voltage data corresponding to each of the divided time windows; and in response to that each cell voltage characteristic meets a preset voltage warning condition, determining that the vehicle has a risk of thermal runaway, and controlling the vehicle to output thermal runaway warning information.

As such, by extracting the cell voltage characteristic of the cell voltage in the time series voltage data of the vehicle, the thermal runaway risk of the vehicle is determined according to the cell voltage characteristic, then the thermal runaway risk of the vehicle is warned, and the thermal runaway risk of the vehicle is determined according to the voltage characteristic change trend of the battery cell voltage. When the vehicle has a risk of thermal runaway, the thermal runaway warning information is input to prompt the user to replace the battery, thereby avoiding the thermal runaway phenomenon of the vehicle, reducing the thermal runaway risk of the vehicle and improving the safety of the vehicle.

Further, based on the above first embodiment, the present application provides a second embodiment of the vehicle thermal runaway warning method.

In this embodiment, the vehicle thermal runaway warning method is also implemented by the aforementioned vehicle as the execution subject. As a feasible embodiment, in the operation S22, the operation of determining the first voltage deviation value of the high voltage subinterval and the second voltage deviation value of the low voltage subinterval in the partial cell voltage data corresponding to each of the time windows may include:

Operation B10, obtaining a first voltage mean value difference of the high voltage subinterval and a second voltage mean value difference of the low voltage subinterval in the partial cell voltage data corresponding to each of the time windows.

It should be noted that in this embodiment the voltage mean value difference is configured to represent the values of the voltage subintervals of some cell voltage data in each time window.

In this embodiment, the first voltage mean value difference of the high voltage subinterval and the second voltage mean value difference of the low voltage subinterval of the partial cell voltage data in each of the time windows are calculated according to the partial cell voltage data.

As a feasible embodiment, in the operation B10, the operation of obtaining the first voltage mean value difference of the high voltage subinterval and the second voltage mean value difference of the low voltage subinterval in the partial cell voltage data corresponding to each of the time windows may include the following operations.

Operation B11, using the partial cell voltage data corresponding to a first time window as an initial window data.

In this embodiment, according to the collection timing corresponding to each time window, the partial cell voltage data corresponding to the first time window is used as the initial window data, for example, the partial cell voltage data of the first time window is used as the initial window data.

Operation B12, obtaining a first cell voltage value of the high voltage subinterval in the initial window data, a second cell voltage value of the high voltage subinterval in the partial cell voltage data corresponding to each of the time windows, a third cell voltage value of the low voltage subinterval in the initial window data and a fourth cell voltage value of the low voltage subinterval in the partial cell voltage data corresponding to each of the time windows.

In this embodiment, the average value of the cell voltage of the high voltage subinterval in the initial window data is acquired to obtain the first cell voltage value of the high voltage subinterval. The average value of the cell voltage of the high voltage subinterval in the partial cell voltage data corresponding to each time window is acquired to obtain the second cell voltage value of the high voltage subinterval. The average value of the cell voltage of the low voltage subinterval in the initial window data is acquired to obtain the third cell voltage value of the low voltage subinterval. The average value of the cell voltage of the low voltage subinterval in the partial cell voltage data corresponding to each time window is acquired to obtain the fourth cell voltage value of the low voltage subinterval.

Operation B13, using a first voltage difference between the first cell voltage value and the second cell voltage value as a first voltage mean value difference of the high voltage subinterval, and using a second voltage difference between the third cell voltage value and the fourth cell voltage value as a second voltage mean value difference of the low voltage subinterval.

In this embodiment, the first voltage difference between the first cell voltage value and the second cell voltage value is calculated as the first voltage mean value difference of the high voltage subinterval, and the second voltage difference between the third cell voltage value and the fourth cell voltage value is calculated as the second voltage mean value difference of the low voltage subinterval.

Operation B20, obtaining a first voltage deviation degree of the high voltage subinterval and a second voltage deviation degree of the low voltage subinterval.

In this embodiment, the first voltage deviation degree of the high voltage subinterval is calculated according to the first voltage mean value difference, the first cell voltage value and the third cell voltage value. The second voltage deviation degree of the low voltage subinterval is calculated according to the second average voltage difference, the second cell voltage value and the fourth cell voltage value.

As a feasible embodiment, in the operation B20, the operation of obtaining the first voltage deviation degree of the high voltage subinterval and the second voltage deviation degree of the low voltage subinterval may include:

Operation B21, obtaining a fifth cell voltage value of each cell voltage data in the high voltage subinterval, a sixth cell voltage value of each cell voltage data in the low voltage subinterval and a voltage median corresponding to each cell voltage data.

In this embodiment, the average cell voltage of each cell voltage value in the high voltage subinterval in the partial cell voltage data corresponding to each time window is acquired to obtain the fifth cell voltage value in the high voltage subinterval. The cell voltage mean value of each cell voltage value in the low voltage subinterval in the partial cell voltage data corresponding to each time window is acquired to obtain the sixth cell voltage value in the low voltage subinterval. The median of the average voltage values of each cell in the high voltage subinterval is acquired to obtain the first voltage median of the cell voltage values in the high voltage subinterval. The median of the average voltage values of each cell in the low voltage subinterval is acquired to obtain the first voltage median of the cell voltage values in the low voltage subinterval.

Operation B22, obtaining a first voltage deviation degree of the high voltage subinterval according to the fifth cell voltage value and the corresponding median voltage, and obtaining a second voltage deviation degree of the low voltage subinterval according to the sixth cell voltage value and the corresponding median voltage.

In this embodiment, the first voltage deviation degree of the high voltage subinterval is determined according to the fifth cell voltage value, the first voltage median, and the voltage data amount of the high voltage subinterval. The second voltage deviation degree of the low voltage subinterval is determined according to the sixth cell voltage value, the second voltage median, and the voltage data amount of the low voltage subinterval:

$$dev_k = \frac{\sum_1^n V_{mid} - V_i}{n}$$

where $dev_k$ is the voltage deviation degree of the voltage subinterval, n is the voltage data amount of the voltage subinterval, $V_{mid}$ is the voltage median of each cell voltage data in the voltage subinterval, and $V_i$ is the cell voltage value of each cell voltage data in the voltage subinterval.

Operation B30, obtaining a first voltage deviation value of the high voltage subinterval according to a first product of the first voltage mean value difference and the first voltage deviation degree, and obtaining a second voltage deviation value of the low voltage subinterval according to a second product of the second voltage mean value difference and the second voltage deviation degree.

'In this embodiment, the first product of the first voltage mean value difference and the first voltage deviation degree is calculated to obtain the first voltage deviation value of the high voltage subinterval. The second product of the second voltage mean value difference and the second voltage deviation degree is calculated to obtain the second voltage deviation value of the low voltage subinterval.

Figure 3:
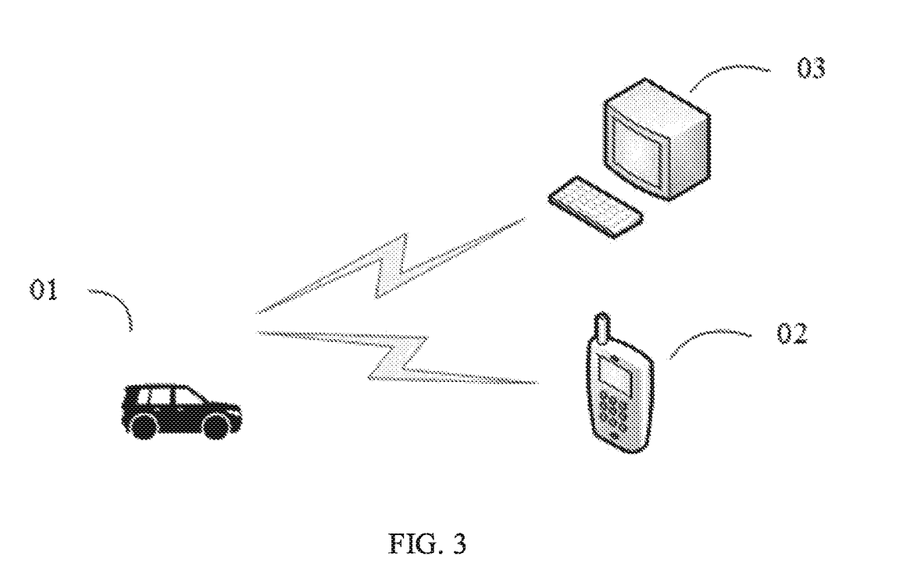
FIG. 3 is a schematic diagram of another application scenario of the vehicle thermal runaway warning method of the present application.

As an example, FIG. 3 is a schematic diagram of an application scenario of the vehicle thermal runaway warning method provided by the present application. As shown in FIG. 3, the application scenario may include: a vehicle 01, a control device 03 in communication with the vehicle 01, and a user equipment 02 in communication with the vehicle 01. In FIG. 3, when all users of the vehicle 01 are not in the vehicle 01, the thermal runaway warning information is sent to the user equipment 02 corresponding to all users through the vehicle 01 to prompt the user to replace the vehicle battery pack. Or, when the first user of the vehicle 01 is in the vehicle 01 and the second user is not in the vehicle 01, it is possible to output and display the thermal runaway warning information through the vehicle 01, and/or send the thermal runaway warning information to the user equipment 02 corresponding to the second user. Or, when all users are not in the vehicle 01, the thermal runaway warning information is sent to the control device 03 through the vehicle 01 to prompt the vehicle operation and maintenance personnel to replace the battery pack.

In this embodiment, by obtaining the cell voltage characteristics corresponding to each time window data in the time-series operating data of the vehicle, the risk of thermal runaway of the vehicle can be determined by judging the preset voltage warning conditions for the cell voltage characteristics. When the vehicle has a risk of thermal runaway, the thermal runaway warning information is input to prompt the user to replace the battery, thereby avoiding the thermal runaway phenomenon of the vehicle, reducing the risk of thermal runaway of the vehicle and improving the safety of the vehicle.

Besides, the embodiments of the present application further provide a vehicle as mentioned in any one of the above embodiments.

Figure 4:
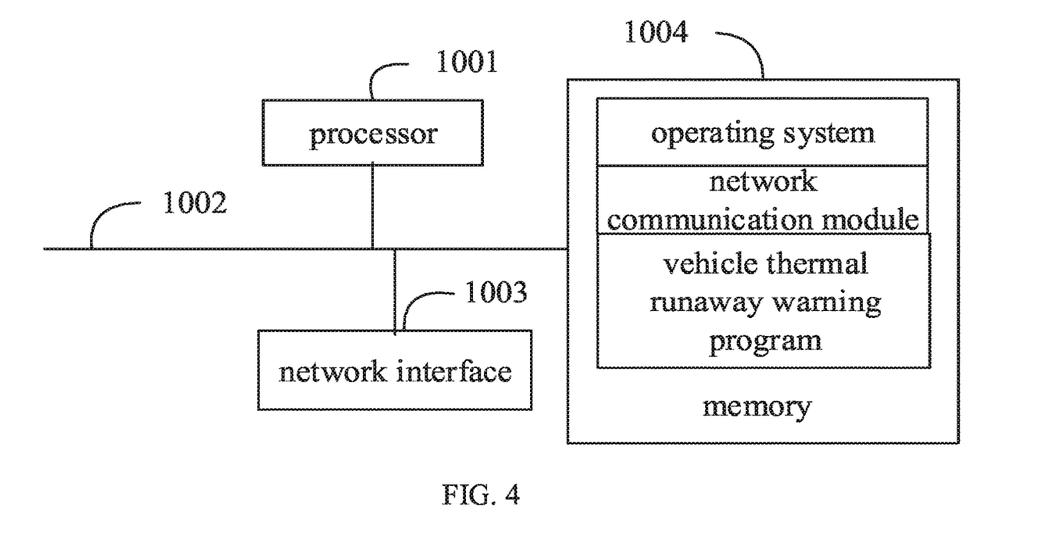
FIG. 4 is a schematic structural diagram of a device of the hardware operating environment involved in the vehicle thermal runaway warning method of the present application.

As shown in FIG. 4, FIG. 4 is a schematic structural diagram of a device of the hardware operating environment involved in the vehicle thermal runaway warning method of the present application.

As shown in FIG. 4, the vehicle may include: a processor 1001, such as a CPU, a communication bus 1002, a network interface 1003, and a memory 1004. The communication bus 1002 is configured to realize connection and communication between the processor 1001 and the memory 1004. The memory 1004 may be a high-speed RAM memory, or a stable memory (non-volatile memory), such as a disk memory. The memory 1004 may also be a storage device independent of the aforementioned processor 1001.

The vehicle may further include a graphical user interface, a network interface, a camera, a radio frequency (RF) circuit, a sensor, an audio circuit, a WiFi module, and the like. The graphical user interface may include a display, an input sub-module such as a keyboard. The graphical user interface can also include a standard wired interface and a wireless interface. The network interface may also include a standard wired interface and a wireless interface (such as a WI-FI interface).

Those skilled in the art can understand that the structure shown in FIG. 4 does not constitute a limitation on the vehicle. Based on different design requirements of actual applications, in different feasible implementation manners, the vehicle may also include more or fewer components than shown, or a combination of certain components, or differently arranged components.

As shown in FIG. 4, the memory 1004 as a storage medium may include an operating system, a network communication module, and a vehicle thermal runaway warning program. The operating system is a program that manages and controls resources based on vehicle hardware and software, and supports the operation of the vehicle thermal runaway warning program and other software and/or programs. The network communication module is configured to realize the communication among various components inside the memory 1004, and communicate with other hardware and software in the vehicle thermal runaway warning system.

In the vehicle shown in FIG. 4, the processor 1001 is configured to execute the vehicle thermal runaway warning program stored in the memory 1004 to implement the operations of the vehicle thermal runaway warning method described in any of the above embodiments.

The specific implementation based on the vehicle of the present application is basically the same as the above embodiments of the vehicle thermal runaway warning method, and will not be repeated herein.

Figure 5:
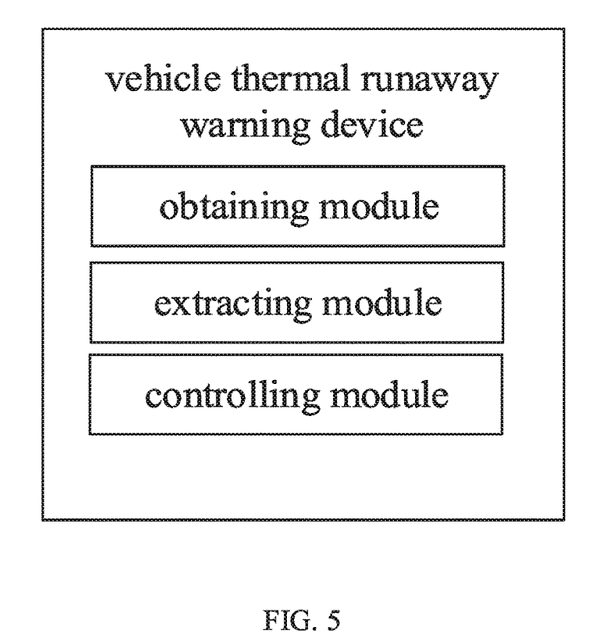
FIG. 5 is a schematic structural diagram of a vehicle thermal runaway warning device according to an embodiment of the present application.

The present application further provides a vehicle thermal runaway warning device. The vehicle thermal runaway warning device is applied to the vehicle to control the vehicle thermal runaway warning, as shown in FIG. 5, the vehicle thermal runaway warning device of the present application includes an obtaining module configure for obtaining operating data of a vehicle, the operating data being a plurality of cell voltage data of a battery pack in the vehicle; an extracting module configured for dividing time windows for the plurality of cell voltage data according to a collection timing of the operating data, and extracting cell voltage characteristics from a partial cell voltage data corresponding to each of the divided time windows; and a controlling module configured for in response to that each cell voltage characteristic meets a preset voltage warning condition, determining that the vehicle has a risk of thermal runaway, and controlling the vehicle to output thermal runaway warning information.

In an embodiment, after the operation of dividing the time windows for the plurality of cell voltage data according to the collection timing of the operating data, the vehicle thermal runaway warning device is further configured for obtaining a voltage range of the battery pack in the vehicle; constructing a voltage interval corresponding to the operating data of the vehicle according to the voltage range and a preset voltage interval range, the voltage interval including at least one voltage subinterval; and dividing the partial cell voltage data corresponding to each of the time windows into corresponding voltage subinterval.

In an embodiment, the cell voltage characteristic includes a first characteristic value and a second characteristic value. The extracting module is further configured for selecting a high voltage subinterval and a corresponding low voltage subinterval corresponding to the partial cell voltage data in each of the voltage subintervals; determining a first voltage deviation value of the high voltage subinterval and a second voltage deviation value of the low voltage subinterval in the partial cell voltage data corresponding to each of the time windows; using a voltage deviation difference between the first voltage deviation value and the second voltage deviation value as the first characteristic value; and using the second voltage deviation value as the second characteristic value.

In an embodiment, before the operation of in response to that each cell voltage characteristic meets the preset voltage warning condition, determining that the vehicle has the risk of thermal runaway, and controlling the vehicle to output the thermal runaway warning information, the vehicle thermal runaway warning device is further configured for determining whether the first characteristic value is greater than a preset characteristic threshold and whether a first discrete degree of the first characteristic value meets a preset first discrete degree, and determining whether the second discrete degree of the second characteristic value meets a preset second discrete degree; and in response to that the first characteristic value is greater than the preset characteristic threshold, the first discrete degree meets the preset first discrete degree, and the second discrete degree meets the preset second discrete degree, determining that the cell voltage characteristic meets the preset voltage warning condition.

In an embodiment, the extracting module is further configured for obtaining a first voltage mean value difference of the high voltage subinterval and a second voltage mean value difference of the low voltage subinterval in the partial cell voltage data corresponding to each of the time windows; obtaining a first voltage deviation degree of the high voltage subinterval and a second voltage deviation degree of the low voltage subinterval; obtaining a first voltage deviation value of the high voltage subinterval according to a first product of the first voltage mean value difference and the first voltage deviation degree; and obtaining a second voltage deviation value of the low voltage subinterval according to a second product of the second voltage mean value difference and the second voltage deviation degree.

In an embodiment, the extracting module is further configured for using the partial cell voltage data corresponding to a first time window as an initial window data; obtaining a first cell voltage value of the high voltage subinterval in the initial window data, a second cell voltage value of the high voltage subinterval in the partial cell voltage data corresponding to each of the time windows, a third cell voltage value of the low voltage subinterval in the initial window data and a fourth cell voltage value of the low voltage subinterval in the partial cell voltage data corresponding to each of the time windows; and using a first voltage difference between the first cell voltage value and the second cell voltage value as a first voltage mean value difference of the high voltage subinterval, and using a second voltage difference between the third cell voltage value and the fourth cell voltage value as a second voltage mean value difference of the low voltage subinterval.

In an embodiment, the extracting module is further configured for obtaining a fifth cell voltage value of each cell voltage data in the high voltage subinterval, a sixth cell voltage value of each cell voltage data in the low voltage subinterval and a voltage median corresponding to each cell voltage data; obtaining a first voltage deviation degree of the high voltage subinterval according to the fifth cell voltage value and the corresponding median voltage; and obtaining a second voltage deviation degree of the low voltage subinterval according to the sixth cell voltage value and the corresponding median voltage.

The specific implementation of each functional module of the vehicle thermal runaway warning device of the present application is basically the same as the above embodiments of the vehicle thermal runaway warning method, and will not be repeated herein.

The embodiment of the present application provides a computer storage medium, and the computer storage medium stores one or more programs. The one or more programs can also be executed by one or more processors to implement the operations of the vehicle thermal runaway warning method described in any one of the above embodiments.

The specific implementation of the computer storage medium of the present application is basically the same as the embodiments of the above-mentioned vehicle thermal runaway warning method, and will not be repeated herein.

The present application further provides a computer program product, including a computer program. When the computer program is executed by a processor, the operations of the above-mentioned vehicle thermal runaway warning method are realized.

The specific implementation of the computer program product of the present application is basically the same as the embodiments of the above-mentioned vehicle thermal runaway warning method, and will not be repeated herein.

It should be noted that in this document, the terms "comprise", "include" or any other variants thereof are intended to cover a non-exclusive inclusion. Thus, a process, method, article, or system that includes a series of elements not only includes those elements, but also includes other elements that are not explicitly listed, or also includes elements inherent to the process, method, article, or system. If there are no more restrictions, the element defined by the sentence "including a . . . " does not exclude the existence of other identical elements in the process, method, article or system that includes the element.

The serial numbers of the foregoing embodiments of the present application are only for description, and do not represent the advantages and disadvantages of the embodiments.

Through the description of the above embodiment, those skilled in the art can clearly understand that the above-mentioned embodiments can be implemented by software plus a necessary general hardware platform, of course, it can also be implemented by hardware, but in many cases the former is a better implementation. Based on this understanding, the technical solution of the present application can be embodied in the form of software product in essence or the part that contributes to the existing technology. The computer software product is stored on a storage medium (such as ROM/RAM, magnetic disk, optical disk) as described above, including several instructions to cause a terminal device (which can be a mobile phone, a computer, a server, an air conditioner, or a network device, etc.) to execute the method described in each embodiment of the present application.

The above are only some embodiments of the present application, and do not limit the scope of the present application thereto. Under the concept of the present application, equivalent structural transformations made according to the description and drawings of the present application, or direct/indirect application in other related technical fields are included in the scope of the present application.

The invention claimed is:

1. A method of vehicle thermal runaway warning, comprising:
   obtaining operating data of a vehicle, wherein the operating data includes a plurality of cell voltage data of a battery pack in the vehicle;
   dividing, according to a collection timing of the operating data, the plurality of cell voltage data into time windows;
   extracting cell voltage characteristics from partial cell voltage data corresponding to each of the divided time windows; and
   in response to each cell voltage characteristic meeting a preset voltage warning condition, determining that the vehicle has a risk of thermal runaway; and
   controlling the vehicle to output thermal runaway warning information.

2. The method according to claim 1, further comprising, after dividing, according to the collection timing of the operating data, the plurality of cell voltage data into the time windows:
   obtaining a voltage range of the battery pack in the vehicle;
   constructing a voltage interval corresponding to the operating data of the vehicle according to the voltage range and a preset voltage interval range, wherein the voltage interval comprises at least one voltage subinterval; and
   dividing the partial cell voltage data corresponding to each of the time windows into a corresponding voltage subinterval.

3. The method according to claim 2, wherein
the cell voltage characteristics comprise a first characteristic value and a second characteristic value; and
the extracting the cell voltage characteristics from the partial cell voltage data corresponding to each of the divided time windows comprises:
   selecting a high voltage subinterval and a low voltage subinterval corresponding to the partial cell voltage data in each of the at least one voltage subinterval;
   determining a first voltage deviation value of the high voltage subinterval and a second voltage deviation value of the low voltage subinterval in the partial cell voltage data corresponding to each of the time windows;
   using a voltage deviation difference between the first voltage deviation value and the second voltage deviation value as the first characteristic value; and
   using the second voltage deviation value as the second characteristic value.

4. The method according to claim 3, further comprising, before the determining that the vehicle has the risk of thermal runaway, and the controlling the vehicle to output the thermal runaway warning information:
   determining whether the first characteristic value is greater than a preset characteristic threshold and whether a first discrete degree of the first characteristic value meets a preset first discrete degree;
   determining whether a second discrete degree of the second characteristic value meets a preset second discrete degree; and
   in response to the first characteristic value being greater than the preset characteristic threshold, the first discrete degree meeting the preset first discrete degree, and the second discrete degree meeting the preset second discrete degree, determining that the cell voltage characteristic meets the preset voltage warning condition.

5. The method according to claim 3, wherein the determining the first voltage deviation value of the high voltage subinterval and the second voltage deviation value of the low voltage subinterval in the partial cell voltage data corresponding to each of the time windows comprises:
   obtaining a first voltage mean value difference of the high voltage subinterval and a second voltage mean value difference of the low voltage subinterval in the partial cell voltage data corresponding to each of the time windows;
   obtaining a first voltage deviation degree of the high voltage subinterval and a second voltage deviation degree of the low voltage subinterval;
   obtaining a first voltage deviation value of the high voltage subinterval according to a first product of the first voltage mean value difference and the first voltage deviation degree; and
   obtaining a second voltage deviation value of the low voltage subinterval according to a second product of the second voltage mean value difference and the second voltage deviation degree.

6. The method according to claim 5, wherein the obtaining the first voltage mean value difference of the high voltage subinterval and the second voltage mean value difference of the low voltage subinterval in the partial cell voltage data corresponding to each of the time windows comprises:

using the partial cell voltage data corresponding to a first time window as an initial window data;

obtaining a first cell voltage value of the high voltage subinterval in the initial window data, a second cell voltage value of the high voltage subinterval in the partial cell voltage data corresponding to each of the time windows, a third cell voltage value of the low voltage subinterval in the initial window data, and a fourth cell voltage value of the low voltage subinterval in the partial cell voltage data corresponding to each of the time windows;

using a first voltage difference between the first cell voltage value and the second cell voltage value as a first voltage mean value difference of the high voltage subinterval; and using a second voltage difference between the third cell voltage value and the fourth cell voltage value as a second voltage mean value difference of the low voltage subinterval.

7. The method according to claim 5, wherein the obtaining the first voltage deviation degree of the high voltage subinterval and the second voltage deviation degree of the low voltage subinterval comprises:

obtaining a fifth cell voltage value of each cell voltage data in the high voltage subinterval, a sixth cell voltage value of each cell voltage data in the low voltage subinterval, and a voltage median corresponding to each cell voltage data;

obtaining a first voltage deviation degree of the high voltage subinterval according to the fifth cell voltage value and a corresponding median voltage; and obtaining a second voltage deviation degree of the low voltage subinterval according to the sixth cell voltage value and the corresponding median voltage.

8. A device of vehicle thermal runaway warning, comprising:

an obtaining module configured to obtain operating data of a vehicle, wherein the operating data comprises a plurality of cell voltage data of a battery pack in the vehicle;

an extracting module configured to divide, according to a collection timing of the operating data, the plurality of cell voltage data into time windows, and extract cell voltage characteristics from partial cell voltage data corresponding to each of the divided time windows; and a controlling module configured to, in response to each cell voltage characteristic meeting a preset voltage warning condition, determine that the vehicle has a risk of thermal runaway, and control the vehicle to output thermal runaway warning information.

9. The device according to claim 8, wherein the obtaining module is further configured to, after dividing, according to the collection timing of the operating data, the plurality of cell voltage data into the time windows:

obtain a voltage range of the battery pack in the vehicle;

construct a voltage interval corresponding to the operating data of the vehicle according to the voltage range and a preset voltage interval range, wherein the voltage interval comprises at least one voltage subinterval; and divide the partial cell voltage data corresponding to each of the time windows into a corresponding voltage subinterval.

10. The device according to claim 9, wherein the cell voltage characteristics comprise a first characteristic value and a second characteristic value; and to extract the cell voltage characteristics, the extracting module is configured to:

select a high voltage subinterval and a low voltage subinterval corresponding to the partial cell voltage data in each of the at least one voltage subinterval;

determine a first voltage deviation value of the high voltage subinterval and a second voltage deviation value of the low voltage subinterval in the partial cell voltage data corresponding to each of the time windows;

use a voltage deviation difference between the first voltage deviation value and the second voltage deviation value as the first characteristic value; and use the second voltage deviation value as the second characteristic value.

11. The device according to claim 10, wherein the controlling module is further configured to, before determining that the vehicle has the risk of thermal runaway, and controlling the vehicle to output the thermal runaway warning information:

determine whether the first characteristic value is greater than a preset characteristic threshold and whether a first discrete degree of the first characteristic value meets a preset first discrete degree;

determine whether a second discrete degree of the second characteristic value meets a preset second discrete degree; and in response to the first characteristic value being greater than the preset characteristic threshold, the first discrete degree meeting the preset first discrete degree, and the second discrete degree meeting the preset second discrete degree, determine that the cell voltage characteristic meets the preset voltage warning condition.

12. The device according to claim 10, wherein to determine the first voltage deviation value of the high voltage subinterval and the second voltage deviation value of the low voltage subinterval, the controlling module is configured to:

obtain a first voltage mean value difference of the high voltage subinterval and a second voltage mean value difference of the low voltage subinterval in the partial cell voltage data corresponding to each of the time windows;

obtain a first voltage deviation degree of the high voltage subinterval and a second voltage deviation degree of the low voltage subinterval;

obtain a first voltage deviation value of the high voltage subinterval according to a first product of the first voltage mean value difference and the first voltage deviation degree; and obtain a second voltage deviation value of the low voltage subinterval according to a second product of the second voltage mean value difference and the second voltage deviation degree.

13. The device according to claim 12, wherein to obtain the first voltage mean value difference of the high voltage subinterval and the second voltage mean value difference of the low voltage subinterval, the controlling module is configured to:

use the partial cell voltage data corresponding to a first time window as an initial window data;

obtain a first cell voltage value of the high voltage subinterval in the initial window data, a second cell voltage value of the high voltage subinterval in the partial cell voltage data corresponding to each of the time windows, a third cell voltage value of the low voltage subinterval in the initial window data, and a fourth cell voltage value of the low voltage subinterval in the partial cell voltage data corresponding to each of the time windows;
use a first voltage difference between the first cell voltage value and the second cell voltage value as a first voltage mean value difference of the high voltage subinterval; and
use a second voltage difference between the third cell voltage value and the fourth cell voltage value as a second voltage mean value difference of the low voltage subinterval.

14. The device according to claim 12, wherein to obtain the first voltage deviation degree of the high voltage subinterval and the second voltage deviation degree of the low voltage subinterval, the controlling module is configured to:
obtain a fifth cell voltage value of each cell voltage data in the high voltage subinterval, a sixth cell voltage value of each cell voltage data in the low voltage subinterval, and a voltage median corresponding to each cell voltage data;
obtain a first voltage deviation degree of the high voltage subinterval according to the fifth cell voltage value and a corresponding median voltage; and
obtain a second voltage deviation degree of the low voltage subinterval according to the sixth cell voltage value and the corresponding median voltage.

15. An electronic equipment, comprising:
at least one processor; and
a memory communicated with the at least one processor, wherein the memory stores instructions executable by the at least one processor, and the instructions are executed by the at least one processor to enable the at least one processor to perform the following:
obtaining operating data of a vehicle, wherein the operating data includes a plurality of cell voltage data of a battery pack in the vehicle;
dividing, according to a collection timing of the operating data, the plurality of cell voltage data into time windows;
extracting cell voltage characteristics from partial cell voltage data corresponding to each of the divided time windows; and
in response to each cell voltage characteristic meeting a preset voltage warning condition, determining that the vehicle has a risk of thermal runaway; and
controlling the vehicle to output thermal runaway warning information.

16. The electronic equipment according to claim 15, wherein the instructions are executed by the at least one processor to enable the at least one processor to further perform the following, after dividing, according to the collection timing of the operating data, the plurality of cell voltage data into the time windows:
obtaining a voltage range of the battery pack in the vehicle;
constructing a voltage interval corresponding to the operating data of the vehicle according to the voltage range and a preset voltage interval range, wherein the voltage interval comprises at least one voltage subinterval; and
dividing the partial cell voltage data corresponding to each of the time windows into a corresponding voltage subinterval.

17. The electronic equipment according to claim 16, wherein
the cell voltage characteristics comprise a first characteristic value and a second characteristic value; and
the extracting the cell voltage characteristics from the partial cell voltage data corresponding to each of the divided time windows comprises:
selecting a high voltage subinterval and a low voltage subinterval corresponding to the partial cell voltage data in each of the at least one voltage subinterval;
determining a first voltage deviation value of the high voltage subinterval and a second voltage deviation value of the low voltage subinterval in the partial cell voltage data corresponding to each of the time windows;
using a voltage deviation difference between the first voltage deviation value and the second voltage deviation value as the first characteristic value; and
using the second voltage deviation value as the second characteristic value.

18. The electronic equipment according to claim 17, wherein the instructions are executed by the at least one processor to enable the at least one processor to further perform the following, before the determining that the vehicle has the risk of thermal runaway, and the controlling the vehicle to output the thermal runaway warning information:
determining whether the first characteristic value is greater than a preset characteristic threshold and whether a first discrete degree of the first characteristic value meets a preset first discrete degree;
determining whether a second discrete degree of the second characteristic value meets a preset second discrete degree; and
in response to the first characteristic value being greater than the preset characteristic threshold, the first discrete degree meeting the preset first discrete degree, and the second discrete degree meeting the preset second discrete degree, determining that the cell voltage characteristic meets the preset voltage warning condition.

19. The electronic equipment according to claim 17, wherein the determining the first voltage deviation value of the high voltage subinterval and the second voltage deviation value of the low voltage subinterval in the partial cell voltage data corresponding to each of the time windows comprises:
obtaining a first voltage mean value difference of the high voltage subinterval and a second voltage mean value difference of the low voltage subinterval in the partial cell voltage data corresponding to each of the time windows;
obtaining a first voltage deviation degree of the high voltage subinterval and a second voltage deviation degree of the low voltage subinterval;
obtaining a first voltage deviation value of the high voltage subinterval according to a first product of the first voltage mean value difference and the first voltage deviation degree; and
obtaining a second voltage deviation value of the low voltage subinterval according to a second product of the second voltage mean value difference and the second voltage deviation degree.

20. The electronic equipment according to claim 19, wherein the obtaining the first voltage mean value difference of the high voltage subinterval and the second voltage mean value difference of the low voltage subinterval in the partial cell voltage data corresponding to each of the time windows comprises:
using the partial cell voltage data corresponding to a first time window as an initial window data;

obtaining a first cell voltage value of the high voltage subinterval in the initial window data, a second cell voltage value of the high voltage subinterval in the partial cell voltage data corresponding to each of the time windows, a third cell voltage value of the low voltage subinterval in the initial window data, and a fourth cell voltage value of the low voltage subinterval in the partial cell voltage data corresponding to each of the time windows;

using a first voltage difference between the first cell voltage value and the second cell voltage value as a first voltage mean value difference of the high voltage subinterval; and using a second voltage difference between the third cell voltage value and the fourth cell voltage value as a second voltage mean value difference of the low voltage subinterval.

* * * * *